United States Patent
Franke et al.

[15] 3,684,753
[45] Aug. 15, 1972

[54] FLAME-RESISTANT POLYURETHANE COMPOSITIONS

[72] Inventors: Norman W. Franke, Penn Hills Twsp., Allegheny County; Gary M. Singerman, Borough of Monroeville, both of Pa.

[73] Assignee: Gulf Research & Development Company, Pittsburgh, Pa.

[22] Filed: Feb. 22, 1971

[21] Appl. No.: 117,749

[52] U.S. Cl..........260/2.5 AT, 252/182, 260/2.5 AJ, 260/75 NT, 260/77.5 AT
[51] Int. Cl.........................C08g 22/18, C08g 22/44
[58] Field of Search.....260/2.5 AT, 77.5 AT, 75 NT, 260/453 AR; 252/182

[56] References Cited

UNITED STATES PATENTS 3,488,374   1/1970   Kober...................260/2.5 AT

FOREIGN PATENTS OR APPLICATIONS 1,158,562   7/1969   Great Britain

OTHER PUBLICATIONS

Kunststoff Handbuch, Band VII, Polyurethane, Vieweg und Hochtlen, Carl Hanser Verlag; Munich 1966, page 16

*Primary Examiner*—James A. Seidleck
*Assistant Examiner*—C. Warren Ivy
*Attorney*—Meyer Neishloss, Deane E. Keith and Donald L. Rose

[57] ABSTRACT

Novel polyurethane foams possessing improved resistance to burning and flame propagation are prepared by employing 2,5-tolylene diisocyanate or its ring-substituted chloro- or bromo- derivatives as a portion of the isocyanate component used in preparing the polyurethane foams.

5 Claims, No Drawings

FLAME-RESISTANT POLYURETHANE COMPOSITIONS

This invention relates to polyurethanes and their preparation. More particularly, the invention relates to novel polyurethane foams possessing improved resistance to burning and flame propagation which may be prepared by the use of, as part of the isocyanate component, 2,5-tolylene diisocyanate, its ring-halogenated derivatives or mixtures thereof.

Polyurethane foams have found wide and varied use in industry. For example, rigid foams are used as heat insulators, and semirigid and flexible foams are used in cushioning, shock absorption, and packaging applications. In many of these important areas, it is required that the material be fire-retardant. Unfortunately, the highly flammable nature of most conventional polyurethane foams limits their acceptance in many applications. This is especially true of foams which are based wholly or partly on the usual commercial mixtures of 2,4- and 2,6-tolylene diisocyanate. Such foams burn rapidly and support combustion once ignited.

The use of certain additives for the purpose of reducing the flammability of polyurethane materials and polyurethane foams is well known to those skilled in the art. Among the additives currently employed for such use are various types of phosphorus-containing compounds. The phosphorus compounds are generally used either alone or in combination with other materials such as organic or inorganic compounds of antimony or halogenated organic materials. The phosphorus-containing compounds may be non-reactive chemicals such as tris(2-chloroethyl)phosphate, tris(2,3-dibromopropyl)phosphate, ammonium phosphate, or more complicated hydroxy compounds which are reacted into the foam structure. Antimony trioxide is also used to reduce the flammability of urethanes, especially in combination with other materials such as a halogenated hydrocarbon or ammonium phosphate.

One drawback of these known compounds and combinations of compounds, however, has been the fact that generally large amounts (up to 35 percent) of the additive must be incorporated into the urethane polymer in order to render it acceptably flame resistant. Such large quantities of additives often have a deleterious effect upon the physical and mechanical properties of the foam, such as dimensional stability, compression strength, density and the like. Mineral fillers tend to settle out; foams are weakened and show a tendency to shrink; some additives tend to crystallize or oil out of the polymer (plasticizer migration) after a relatively short time of incorporation therein, thus restoring the foam to its original untreated condition.

Much of the polyurethane foam currently produced is foam in which the isocyanate component is either wholly 2,4- and/or 2,6-tolylene diisocyanate (usually an 80/20 or 65/35 blend of 2,4-/2,6-tolylene diisocyanate) or a blend of 2,4- and 2,6-tolylene diisocyanate with one or more polyisocyanates which are not homologs of tolylene diisocyanate, such as polymethylene polyphenylisocyanate or 4,4'-diphenylmethane diisocyanate and the like as exemplified hereinbelow. The expression polyisocyanate, as used herein, is intended to include diisocyanate.

We have now made the surprising discovery that such foams, whether rigid, semirigid, or flexible, which are based entirely or partly on tolylene diisocyanate, possess improved resistance to burning and flame propagation if part of the 2,4- and 2,6-tolylene diisocyanate blend normally employed is replaced with 2,5-tolylene diisocyanate. The 2,4- and 2,6-isomers of tolylene diisocyanate are meta-diisocyanates, whereas 2,5-tolylene diisocyanate is a para-diisocyanate. It is surprising and unexpected that a change in the orientation of the two isocyanate groups on the benzene ring from a meta to a para orientation would result in a decrease in the flammability of polyurethane foams. This improved resistance to burning and flame propagation occurs both in the absence of and in the presence of flammability retarding additives and when such additives are used, suitable flame retardance is obtained at substantially lower concentrations of such additives. The 2,5-tolylene diisocyanate is not regarded herein as a flame-retarding additive but rather is one of the reacting monomers whose presence in the polymer chains enhances the flame retardancy and resistance to burning of the final foamed polymer.

It is therefore an object of the invention to produce novel polyurethane foams possessing improved resistance to burning and flame propagation.

It is a further object of the invention to provide novel polyurethane foams possessing improved resistance to burning and flame propagation without the use of flame-retarding additives.

It is another object of the invention to provide polyurethane foams having good resistance to burning and flame propagation using lower amounts of flame-retarding additives than heretofore used with a resulting improvement in the chemical and physical properties of the polyurethane foams.

These objects, and other objects which will be apparent by reading the more detailed description hereinbelow, are achieved by replacing a portion of the isocyanate component conventionally employed in the production of polyurethane foams, particularly 2,4- and/or 2,6-tolylene diisocyanate, by 2,5-tolylene diisocyanate, its mono-, di- and tri-, ring-halogenated derivatives, or mixtures thereof. Advantageously, the amount of 2,5-tolylene diisocyanate or its halogenated derivatives which are employed according to the process of the invention is from about 8 weight percent to about 60 weight percent, preferably 15 percent to 50 percent, of the total isocyanates used in making the polyurethanes, whether the isocyanates used are solely of the tolylene diisocyanate type or other polyisocyanates which are not homologs of tolylene diisocyanate or mixtures of these. Such non-homologous polyisocyanates are exemplified hereinbelow. Since the incorporation of 2,5-tolylene diisocyanate in the polyurethane foam composition tends to reduce the values of several ASTM tests such as the indentation load deflection test, the compression load deflection test, the 90 percent compression set test and the indentation residual gage load test, the amount of 2,5-tolylene diisocyanate in the total isocyanates has been restricted to a maximum value of about 60 percent in order to avoid the undue lowering of the properties indicated by these tests while benefitting from the advantages from the use of 2,5-tolylene diisocyanate.

The principal reactants employed in the preparation of polyurethane foams are an active-hydrogen containing compound such as a polyhydroxy polyether and an organic polyisocyanate. Rigid polyurethane foams are generally provided by employing a polyhydroxy polyether having a hydroxyl number between about 175 and 800 as the active-hydrogen containing compound. In preparing semirigid foams the hydroxyl number of the polyhydroxy polyether should be between about 75 and about 175, while flexible foams are provided by employing polyhydroxy polyethers having hydroxyl numbers between about 30 and about 60.

In the preparation of polyurethanes according to the invention, conventional procedures are employed. The various methods for the preparation of polyurethane foams are well known in the art and do not require detailed discussion; see, for example, Dombrow, "Polyurethanes", Reinhold Publishing Corp., New York, pages 1 to 105 (1957); Saunders et al., "Polyurethanes", Part I, Interscience Publishers, N. Y. (1962).

One of the commonest procedures consists in reacting a polyol, for example, a polyester or polyether, with an organic polyisocyanate and with water, if necessary in the presence of catalysts, surface active agents or other auxiliary agents, whereby simultaneous interaction between the isocyanate, water and the polyol occurs to give the required foam product. This is the so-called "one-shot" procedure. Alternatively the polyol may be reacted with sufficient polyisocyanate to give an intermediate reaction product containing free isocyanate groups and this product, known as prepolymer, may then be reacted with water, if desired in the presence of catalyst, surface active agents or other auxiliary agents, in order to produce the final foamed product. This latter is the so-called "prepolymer" process. Many variations in the method of carrying out these basic processes are known.

Any of the widely known organic polyisocyanates, in accordance with the present invention, can be used in admixture with 2,5-tolylene diisocyanate, its halogenated derivates, or mixtures thereof. Typical exemplificative isocyanates include, but are not limited to, the following: 2,4-tolylene diisocyanate; 2,6-tolylene diisocyanate; methylene-bis(4-phenyl isocyanate); 3,3'-bitoluene-4,4'-diisocyanate; 3,3'-dimethoxy-4,4'-biphenylene diisocyanate; naphthalene-1,5-diisocyanate; hexamethylene diisocyanate; 1,4-phenylene diisocyanate; polyphenylene polymethylene polyisocyanate; mixtures of these; and the like. The amount of isocyanate employed in the preparation of the polyurethane foams should be sufficient to provide at least 0.7 NCO group per hydroxyl group present in the reaction system. An excess of isocyanate compound may be conveniently employed, however, this is generally undesirable due to the high cost of the isocyanate compounds. It is preferable, therefore, to employ no greater than about 1.5 NCO groups per hydroxyl group and preferably between about 0.9 and 1.1 NCO groups per hydroxyl group.

Any of the polyols conventionally employed in the preparation of polyurethane foams can be employed in the process of the invention. The polyol component can be a single polyol compound or it can be a mixture of two or more polyol compounds. It is preferred to use a polyol having from two to eight hydroxyl groups and a molecular weight of from about 200 to about 5,000. The most suitable compounds are prepared by reacting an alkylene oxide such as, ethylene oxide, 1,2-propylene oxide, 1,2-butylene oxide, 2,3-butylene oxide, epichlorohydrin, styrene oxide, or the like with an active hydrogen containing component which preferably has at least three hydrogen atoms which can be reacted with the alkylene oxide to add the alkylene oxide onto the molecule and thus produce a polyhydric polyalkylene ether. The most suitable compounds of the latter type are either polyamines or polyhydric alcohols including for example, ethylene diamine, 2,4-diamino toluene, 1,3-propylene diamine, 4,4'-diaminodiphenyl methane, p-phenylene diamine, 1,4-butane diamine, 1,6-hexamethylene diamine, trimethylolpropane, glycerine, pentaerythritol, sorbitol, 1,2,6-hexane triol, mannitol, alpha-methyl-d-glucoside and the like. It is also possible to use those active hydrogen compounds which are substantially difunctional such as, for example, polyethylene glycol having a molecular weight of 1,500, polypropylene glycol having a molecular weight of 2,000 and similar difunctional components which normally produce flexible, foamed polyurethanes when reacted with organic diisocyanates.

It is also possible to use polyesters as the active hydrogen containing compound. For this purpose, any suitable polyester can be used such as are obtained, for example, from polycarboxylic acids and polyhydric alcohols. Any suitable polycarboxylic acid can be used such as, for example, oxalic acid, malonic acid, succinic acid, glutaric acid, adipic acid, pimelic acid, suberic acid, azelic acid, sebacic acid, brassylic acid, thapsic acid, maleic acid, fumaric acid, glutaconic acid, alpha-hydromuconic acid, beta-hydromuconic acid, alpha-butyl-alpha-ethylglutaric acid, alpha-beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol can be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

The polyol component employed in making polyurethanes in accordance with this invention can, if desired, also include a phosphorus-containing polyol of the type known in the art to impart fire retardancy to polyurethanes. In this way it is possible to enhance still further the degree of fire retardancy imparted to the resulting polyurethanes by 2,5-tolylene diisocyanate, and its halogenated derivatives. Less of these phosphorus-containing polyols may be used to impart the desired degree of fire retardancy to the polyurethanes than was hitherto possible, resulting in lower costs and in lesser adverse effects upon physical properties such as dimensional stability which can be caused by the amounts of the phosphorus-containing polyols currently employed commercially.

Examples of phosphorus-containing polyols which can be employed in combination with the above polyols are dialkyl N,N-di(hydroxyalkyl)aminomethane phosphonates such as diethyl N,N-di(2-hydroxyethyl)aminomethane phosphonate, propylene oxide adducts of phosphoric acid such as those described in U.S. Pat. Nos. 2,372,244 and 3,094,549, and tris propylene glycol phosphates such as those described in U.S. Pat. No. 3,061,625.

The foaming agent employed may be any of those known to be useful for this purpose, such as water, the halogenated hydrocarbons, and mixtures thereof. Typical halogenated hydrocarbons include, but are not limited to, the following: monofluorotrichloromethane; difluorodichloromethane; 1,1,2-trichloro-1,2,2-trifluoroethane; methylene chloride; chloroform and carbon tetrachloride. The amount of foaming agent employed may be varied within a wide range depending on the desired density of the resulting foam. Generally, however, the halogenated hydrocarbons are employed in an amount from 1 to 50 parts by weight per 100 parts by weight of the polyhydroxy polyether and water can be employed in an amount of from 0.1 to 10 parts by weight per 100 parts by weight of the polyhydroxy polyether.

Any of the catalysts known to be useful in the preparation of polyurethane foams can be employed in this process including tertiary amines, metallic salts and mixtures thereof. Typical tertiary amines include, but are not limited to, the following: 1,1,3,3-tetramethylbutanediamine, 1,3-bis(dimethylamino)-2-propanol, N-methyl morpholine, N-hydroxyethyl morpholine, triethylene diamine, triethylamine and trimethylamine. Typical metallic salts include, for example, the salts of antimony, tin and iron, e.g., dibutyl tin dilaurate, stannous octoate, etc. Generally speaking, the catalyst is employed in an amount from 0.1 to 2.0 percent by weight based on the polyhydroxy polyether.

It is very desirable to have a foam stabilizer or surfactant present in the course of the reaction, and here one can use organosilicone polymers including polydimethyl siloxane and preferably one having a viscosity between about 20 and about 200 centipoises at 25° C. or an alkyl silane polysiloxane polyoxyalkylene block copolymer such as those disclosed in U.S. Pat. No. 2,834,748. Other surfactants such as ethylene oxide modified sorbitan monopalmitate, ethylene oxide modified polypropyleneether glycol, sulphonated castor oil, and oxyethylated tall oils can be used.

Various additives can be employed which serve to modify properties or lower cost such as fillers including clay, calcium sulfate, or ammonium phosphate. Ingredients such as dyes may be added for color, and fibrous glass, asbestos, or synthetic fibers can be added for strength. In addition, plasticizers, deodorants and antioxidants can be added in accordance with practices well known in the art.

The following examples serve to illustrate the invention but are not intended as limitations. All percentages used in the examples are by weight unless otherwise indicated.

EXAMPLE 1

A flexible polyurethane foam was prepared from the following ingredients.

| Ingredient: | Grams |
| --- | --- |
| Polyalkyleneether triol[1] | 100 |
| Tolylene diisocyanate[2] | 45 |
| Silicone oil[3] | 0.8 |
| Dibutyltin dilaurate | 0.1 |
| N-ethylmorpholine | 0.1 |
| 1,3-bis(dimethylamino)-2-propanol | 0.16 |
| Water | 3.5 |

[1] A polyoxypropylene derivative of glycerine having a basic functionality of 3, an average molecular weight of about 3,000, and a hydroxyl number of about 56.
[2] A mixture of 52.8 percent 2,4-tolylene diisocyanate, 18.2 percent 2,6-tolylene diisocyanate and 29.0 percent 2,5-tolylene diisocyanate.
[3] A polysiloxane - polyoxyalkylene block copolymer used as a foam stabilizer or surfactant available commercially under the trade designation "Silicone L–540" from the Union Carbide Corporation.

In this example, all of the ingredients except the tolylene diisocyanate were first blended together in a laboratory blender. The tolylene diisocyanate was then added as rapidly as possible and blended thoroughly. The mixture was poured into an open 3-inch × 6.5-inch × 10-inch cardboard box. The resulting flexible foam was allowed to stand for about 15 minutes at room temperature and then was cured at 120° C. for 30 minutes. It was then allowed to stand overnight at room temperature. The density of the foam was 1.81 p.c.f.; it was classified as burning according to ASTM test D1692, with a burning rate of 2.96 inches per minute.

EXAMPLE 2

A flexible polyurethane foam was prepared as described in Example 1 with the exception that the tolylene diisocyanate mixture of Example 1 was replaced with 45 grams of a mixture of 80 percent 2,4-tolylene diisocyanate and 20 percent 2,6-tolylene diisocyanate. The density of the resulting foam was 1.81 p.c.f.; it was classified as burning according to ASTM test D1692, with a burning rate of 4.27 inches per minute. Comparison of this result with that of Example 1 shows that the foam of this example burned 30.7 percent faster than the foam of Example 1.

EXAMPLE 3

A flexible polyurethane foam was prepared as described in Example 1, with the exceptions that the polyalkyleneether triol of Example 1 was replaced with 100 grams of a polyalkyleneether triol having a molecular weight of about 3,500 and a hydroxyl number of about 47.5 (known under the trade designation of "Niax polyol 16-46"), and the tolylene diisocyanate component of Example 1 was replaced with 42 grams of a mixture of 64.8 percent 2,4-tolylene diisocyanate, 18.2 percent 2,6-tolylene diisocyanate, and 17.0 percent of 2,5-tolylene diisocyanate. The density of the resulting foam was 1.81 p.c.f.; it was classified as burning according to ASTM test D1692, with a burning rate of 3.38 inches per minute.

EXAMPLE 4

A flexible polyurethane foam was prepared as described in Example 3 with the exception that the tolylene diisocyanate mixture of Example 2 was replaced with 42 grams of a mixture of 52.8 percent 2,4-tolylene diisocyanate, 18.2 percent 2,6-tolylene diisocyanate, and 29.0 percent 2,5-tolylene diisocyanate. The density of the resulting foam was 1.97 p.c.f.; it was classified as burning according to ASTM test D1692, with a burning rate of 2.60 inches per minute.

EXAMPLE 5

A flexible polyurethane foam was prepared as described in Example 3 with the exception that the tolylene diisocyanate mixture of Example 3 was replaced with 42 grams of a mixture of 32.5 percent 2,4-tolylene diisocyanate, 17.5 percent 2,6-tolylene diisocyanate, and 50.0 percent 2,5-tolylene diisocyanate. The density of the resulting foam was 2.63 p.c.f.; it was classified as burning according to ASTM test D1692, with a burning rate of 3.21 inches per minute. The body of the foam actually burned significantly slower than this; surface flash accounted for the rate of 3.21 inches per minute.

EXAMPLE 6

A flexible polyurethane foam was prepared as described in Example 3 with the exception that the tolylene diisocyanate mixture of Example 3 was replaced with 42 grams of a mixture of 80 percent 2,4-tolylene diisocyanate and 20 percent 2,6-tolylene diisocyanate. The density of the resulting foam was 2.08 p.c.f.; it was classified as burning according to ASTM test D1692, with a burning rate of 4.70 inches per minute. Comparison of this result with those of Examples 3 to 5 shows that the foam of this example burned 28.1 percent faster than the foam of Example 3, 44.7 percent faster than the foam of Example 4, and 31.7 percent faster than the foam of Example 5.

EXAMPLE 7

A flexible polyurethane foam was prepared as described in Example 4 with the exception that 10.0 grams of a flame-retarding material, 2,2-bis(chloromethyl)-1,3-propylenebis[bis(2-chloroethyl)phosphate], commercially available as "Phosgard 2XC-20" from the Monsanto Company, was added to the formulation. The density of the resulting foam was 2.12 p.c.f. Of six samples tested according to ASTM D1692, five were self-extinguishing with an extent of burning of 4.56 inches, and one burned with a burning rate of 1.94 inches per minute.

EXAMPLE 8

Example 7 was repeated, except that 11.0 grams of Phosgard 2XC-20 were employed. The formulation resulted in a flexible foam having a density of 2.13 p.c.f. All samples tested were self-extinguishing, with an extent of burning of 3.75 inches.

EXAMPLE 9

A flexible polyurethane foam was prepared as described in Example 6 with the exception that 11.5 grams of Phosgard 2XC-20 were added to the formulation. The density of the resulting foam was 1.99 p.c.f. It was classified as burning according to ASTM test D1692, with a burning rate of 1.60 inches per minute.

EXAMPLE 10

Example 9 was repeated, except that 13.0 grams of Phosgard 2XC-20 were employed. The formulation resulted in a flexible foam having a density of 2.10 p.c.f. It was classified as self-extinguishing according to ASTM D1692, with an extent of burning of 2.65 inches. Comparison of the results of Examples 9 and 10 with those of Examples 7 and 8 shows that less of the flame-retarding phosphate ester is required to achieve a self-extinguishing rating for the foams of Examples 7 and 8 than for the foams of Examples 9 and 10.

EXAMPLE 11

A rigid polyurethane foam was prepared from the following ingredients.

| Ingredient: | Grams |
| --- | --- |
| Polyether polyol[1] | 115.6 |
| Polyisocyanate[2] | 73.4 |
| Tolylene diisocyanate[3] | 43.5 |
| Silicone oil[4] | 2.0 |
| N,N,N',N'-tetramethylbutane-1,4-diamine | 1.5 |
| Flurotrichloromethane | 45 |

[1] A polyoxypropylene derivative of sucrose having an equivalent weight of about 116 and a hydroxyl number of about 485.
[2] A polymethylene polyphenylisocyanate having an isocyanate equivalent of about 133.5, an available NCO content of about 32 percent and a viscosity of 25°C. of about 250 c.p.s.
[3] A mixture of 52.8 percent 2,4-tolylene diisocyanate, 18.2 percent 2,6-tolylene diisocyanate, and 29.0 percent 2,5-tolylene diisocyanate.
[4] A polysiloxane - polyoxyalkylene block copolymer used as a foam stabilizer or surfactant, available commercially under the trade designation "DC-195" from the Dow Corning Corporation.

In this example, all of the ingredients except the polyisocyanate and the tolylene diisocyanate were blended together by means of an air-driven stirrer. The combined polyisocyanate and tolylene diisocyanate were then added to the blend as rapidly as possible and the mixture was thoroughly blended and poured into an open cardboard box. The resulting rigid foam had a density of 1.49 p.c.f. It was classified as burning according to ASTM D1692, with a burning rate of 11.34 inches per minute.

EXAMPLE 12

A rigid polyurethane foam was prepared as described in Example 11, with the exception that the tolylene diisocyanate mixture of Example 11 was replaced with 43.5 grams of a mixture of 80 percent 2,4-tolylene diisocyanate and 20 percent 2,6-tolylene diisocyanate. The density of the resulting foam was 1.51 p.c.f.; it was classified as burning according to ASTM D1692, with a burning rate of 17.49 inches per minute. Comparison of this result with that of Example 11 shows that the foam of this example burns 35.2 percent faster than the foam of Example 11.

In like manner, polyurethane foams are made less flammable by replacing a portion of the isocyanate component conventionally employed, particularly 2,4- and/or 2,6-tolylene diisocyanate, in producing polyurethane foams by mono-, di- or trichloro- or bromo-, ring-substituted 2,5-tolylene diisocyanates or mixtures thereof, provided that such represent from about 8 percent to about 60 percent, preferably about 15 to about 50 percent, of the total isocyanate component used to make the foam.

Although specific examples of the invention have been set forth hereinabove, it is not intended to limit the invention thereto, but to include all of the variations and modifications falling within the scope of the appended claims.

We claim:

1. A fire-retardant polyurethane foam comprising the reaction product of an aromatic polyisocyanate mixture comprising from about 8 to about 60 weight percent based on the total polyisocyanate mixture of 2,5-tolylene diisocyanate, a ring-substituted chloro- or bromo-derivative of 2,5-tolylene diisocyanate, or mixtures thereof and a polyol having at least two active hydrogens selected from polyether polyols, polyester polyols and mixtures thereof in the presence of a foaming agent.

2. A fire-retardant polyurethane foam in accordance with claim 1 in which the polyisocyanate mixture comprises from about 40 to about 92 percent 2,4-tolylene diisocyanate, 2,6-tolylene diisocyanate or mixtures thereof.

3. A fire-retardant polyurethane foam in accordance with claim 2 in which the polyisocyanate mixture comprises from about 15 to about 50 percent 2,5-tolylene diisocyanate.

4. A fire-retardant polyurethane foam in accordance with claim 1 comprising a minor quantity of a flammability retarding additive composition.

5. A fire-retardant polyurethane foam in accordance with claim 4 in which the polyisocyanate mixture comprises from about 40 to about 92 percent 2,4-tolylene diisocyanate, 2,6-tolylene diisocyanate or mixtures thereof.

* * * * *